(12) United States Patent
Ekambaram et al.

(10) Patent No.: US 10,904,128 B2
(45) Date of Patent: Jan. 26, 2021

(54) TESTING FUNCTIONALITY OF AN INTERNET OF THINGS ENVIRONMENT

(71) Applicant: INTERNATIONAL BUSINESS MACHINES CORPORATION, Armonk, NY (US)

(72) Inventors: Vijay Ekambaram, Chennai (IN); Padmanabha Venkatagiri Seshadri, Mysore (IN); Vijay Kumar Ananthapur Bache, Bangalore (IN); Saravanan Sadacharam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 16/129,995

(22) Filed: Sep. 13, 2018

(65) Prior Publication Data

US 2020/0092192 A1 Mar. 19, 2020

(51) Int. Cl.
*H04L 12/26* (2006.01)
*G06F 11/34* (2006.01)
(Continued)

(52) U.S. Cl.
CPC .......... *H04L 43/50* (2013.01); *G06F 11/3457* (2013.01); *G06F 16/951* (2019.01); *H04L 67/12* (2013.01); *H04W 4/70* (2018.02)

(58) Field of Classification Search
CPC .......... H04L 43/50; H04L 67/12; H04W 4/70; G06F 16/951; G06F 11/3457
See application file for complete search history.

(56) References Cited

U.S. PATENT DOCUMENTS

| 9,582,264 B1 | 2/2017 | Anbil Parthipan et al. |
| 2013/0047038 A1* | 2/2013 | Huang ................ G06F 13/4022 714/38.1 |

(Continued)

FOREIGN PATENT DOCUMENTS

| CN | 202873069 U | 4/2013 |
| CN | 102946616 B | 7/2015 |
| CN | 106411637 A | 2/2017 |

OTHER PUBLICATIONS

Daniel Kuemper, Eike Steffen Reetz, Daniel Holker, and Ralf Tonjes, Test-Enhanced Life Cycle for Composed IoT-Based Services, T. Bauschert (Ed.): EUNICE 2013, LNCS 8115, pp. 314-319, Aug. 28-30, 2013. (Year: 2013).*

(Continued)

*Primary Examiner* — Philip C Lee
(74) *Attorney, Agent, or Firm* — William Hartwell; Matthew M. Hulihan; Heslin Rothenberg Farley & Mesiti PC

(57) ABSTRACT

Testing functionality of an Internet of Things environment includes obtaining a description of the IoT environment, ascertaining, based on the description, objective function(s) of the IoT environment, crawling online resources and discovering example scenario(s) in which problems related to the ascertained objective function(s) are identified, the example scenario(s) each involving a respective set of IoT devices, and automatically testing the IoT environment to assess functionality of the IoT environment in performing at least one of the objective function(s). The automatically testing includes selectively controlling communications between a set of IoT devices of the IoT environment, which are selected from the IoT devices of the IoT environment based on the example scenario(s) discovered from the crawling.

20 Claims, 5 Drawing Sheets

(51) Int. Cl.
*H04W 4/70* (2018.01)
*H04L 29/08* (2006.01)
*G06F 16/951* (2019.01)

(56) References Cited

U.S. PATENT DOCUMENTS

2016/0261465 A1* 9/2016 Gupta ..................... H04L 41/14
2017/0149937 A1 5/2017 Ren et al.
2017/0168885 A1 6/2017 Jain et al.
2017/0264501 A1* 9/2017 Mathen .................. H04L 41/16
2017/0337177 A1* 11/2017 Maxwell, III .......... G06F 40/14
2017/0364747 A1 12/2017 Ekambaram et al.

OTHER PUBLICATIONS

"Testing the Internet of Things", Test and Verification Solutions, http://www.testandverification.com/wp-content/uploads/Testing%20the%20Internert%20of%20Things.pdf, 21 pgs.
Rohrman, J., "Testing the Internet of Things", https://web.archive.org/web/20160304014048/http://blog.smartbear.com/user-experience/testing-the-internet-of-things/, Feb. 25, 2015, 5 pgs.
"The IOT Process", http://www.nviot-forum.org/IOT_Process.shtml, 3 pgs.
Mell, Peter, et al., "The NIST Definition of Cloud Computing", NIST Special Publication 800-145, Sep. 2011, Gaithersburg, MD, 7 pgs.

* cited by examiner

TESTING FUNCTIONALITY OF AN INTERNET OF THINGS ENVIRONMENT

BACKGROUND

Testing networked devices facilitates assessment of device performance across different use cases. Particularly in the case of Internet of Things (IoT) devices, testing helps to ensure that the IoT ecosystem functions, or if necessary can be reconfigured to function, properly in actual implementations and applications.

SUMMARY

Testing IoT devices can be challenging. Unlike testing that involves a single application on a single device, it tests multiple applications distributed across multiple devices that cooperatively work for common objective(s). The following are some factors that present challenges to effective IoT testing: the presence of heterogeneous devices in the IoT ecosystem/environment; the presence of heterogeneous applications; potential absence of a common protocol followed across the IoT devices; and the complexity of interactions between the IoT devices. The identification of bottlenecks and other problems can become very cumbersome due to the complications associated with interactions across several applications and different devices.

Shortcomings of the prior art are overcome and additional advantages are provided through the provision of a computer-implemented method. The method obtains, for an Internet of Things (IoT) environment having a collection of IoT devices, a description of the IoT environment. The method ascertains, based on the description, objective function(s) of the IoT environment. The method crawls online resources and discovers example scenario(s) in which problems related to the ascertained objective function(s) are identified. The example scenario(s) each involve a respective set of IoT devices. The method also automatically tests the IoT environment to assess functionality of the IoT environment in performing at least one of the objective function(s). The automatically testing includes selectively controlling communications between a set of IoT devices of the IoT environment. The set of IoT devices of the IoT environment are selected from the collection of IoT devices of the IoT environment based on the example scenario(s) discovered from the crawling.

Further, a computer program product including a computer readable storage medium readable by a processing circuit and storing instructions for execution by the processing circuit is provided for performing a method. The method obtains, for an Internet of Things (IoT) environment having a collection of IoT devices, a description of the IoT environment. The method ascertains, based on the description, objective function(s) of the IoT environment. The method crawls online resources and discovers example scenario(s) in which problems related to the ascertained objective function(s) are identified. The example scenario(s) each involve a respective set of IoT devices. The method also automatically tests the IoT environment to assess functionality of the IoT environment in performing at least one of the objective function(s). The automatically testing includes selectively controlling communications between a set of IoT devices. The set of IoT devices of the IoT environment are selected from the collection of IoT devices of the IoT environment based on the example scenario(s) discovered from the crawling.

Yet further, a computer system is provided that includes a memory and a processor in communication with the memory. The computer system is configured to perform a method. The method obtains, for an Internet of Things (IoT) environment having a collection of IoT devices, a description of the IoT environment. The method ascertains, based on the description, objective function(s) of the IoT environment. The method crawls online resources and discovers example scenario(s) in which problems related to the ascertained objective function(s) are identified. The example scenario(s) each involve a respective set of IoT devices. The method also automatically tests the IoT environment to assess functionality of the IoT environment in performing at least one of the objective function(s). The automatically testing includes selectively controlling communications between a set of IoT devices of the IoT environment. The set of IoT devices of the IoT environment are selected from the collection of IoT devices of the IoT environment based on the example scenario(s) discovered from the crawling.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
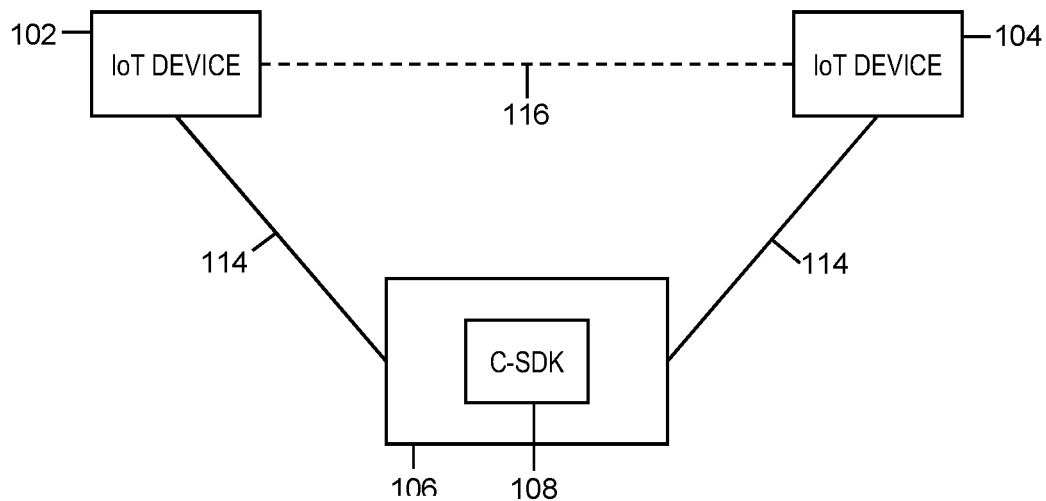
FIG. 1 depicts an example environment to incorporate and use aspects described herein.

Described herein are facilities for stress testing an IoT ecosystem (also referred to herein as an IoT environment) in an intelligent manner that also tests corner or so called 'edge' cases. Testing can be a significant bottleneck in the evaluation of IoT environment functionality. Many of the inputs and outputs are not static, depending instead on the particular IoT environment, devices, and objectives involved.

Described approaches for stress-testing an IoT ecosystem selectively make/break connections across IoT components using a control software development kit ("C-SDK"), in which combinations of enabled, disabled, and/or tailored connections between components are derived for test cases by crawling online sources to detect negative text snippets, i.e. those expressing a negative tone or sentiment and signifying potential functional problems that may apply to the target IoT environment being tested. For instance, negative text snippets are those pertaining to IoT environments having objective function(s) similar to or the same as those of the target IoT environment to be tested. Various sets of component combinations to test, and corresponding to the objective functions of the target IoT environment, are ascertained from the discovered negative text snippets.

The Internet of Things (IoT) refers to a network of physical computing devices, for instance embedded in other objects like sensing devices, appliances, mobile devices, and others, having network connectivity and enabling the devices to collect and exchange data. An IoT network can include one or more IoT devices or "smart devices", that are physical network-enabled objects. Further example objects include thermostats, sensor based devices, smoke alarms, lights, home appliances, audio systems, mobile devices, televisions, security cameras, security sensors, and heating, ventilation, and air conditioning (HVAC) zones, among countless other examples. Many of these objects are devices that are independently operable, but they may also be paired with a control system or alternatively a distributed control system such as one running over a cloud computing environment. The network of physical objects can be embedded with electronics, sensors, software, and connectivity to enable the exchange of data with other connected devices over a data communication infrastructure, typically according to some standard or specification.

In many cases, IoT devices are not associated with any particular user. They instead represent a physical object and monitor its behavior, such as using embedded sensors and electronics. IoT allows objects to be sensed and controlled remotely across existing network infrastructure, creating opportunities for direct integration of the physical world into computer-based systems, and resulting in improved efficiency, accuracy, and economic benefit.

In some examples, IoT devices may be used to monitor and control the mechanical, electrical, and electronic systems used in various types of commercial and residential buildings. For example, IoT devices may be used to monitor and control the lighting, heating, ventilation, air conditioning, home appliances, communication systems, entertainment, and home security devices in a home to improve convenience, comfort, energy efficiency, and security, as examples.

As noted, various different devices often operate under differing standards, legal requirements, contractual obligations, and/or regulatory requirements, and have their own input/output methods. Individually incorporating such devices into an automation system can be tedious and complicated. Consequently, testing of various IoT environments and the behavior of such can be important.

Aspects described herein are facilitated by a C-SDK. In some examples, a collection of IoT devices/components in an IoT ecosystem (for example each such device/component) connects to another device/component via the C-SDK. The C-SDK can programmatically and dynamically make or break a connection with or between device(s) of the environment. 'Connection' refers to a communication connection, for instance a data communication link, which may be a wired and/or wireless link, such as an Ethernet-based, Wi-Fi, Bluetooth, or near-field connection, as examples.

The C-SDK can reside within, or be in communication with, the target IoT ecosystem to be tested. The C-SDK can mimic requests/responses of devices of the IoT ecosystem. In some examples, the C-SDK is in data communication with most or all of the IoT devices of the environment. The C-SDK can obtain/receive data, requests, responses, and any other desired information or data from the sensors and other IoT devices of the environment.

FIG. 1 depicts an example environment to incorporate and use aspects described herein. Here, a simplified environment is depicted with just two IoT devices 102, 104 and a computer system 106 having C-SDK software 108 installed thereon. In other examples, tens or hundreds of IoT devices may form the IoT environment.

The C-SDK 108 is installed on computer system 106, which could be, for instance, a user's mobile device, home automation server, hub, gateway or other edge device, a remote computer system/server remote from the physical devices of the IoT environment, or any other computer system(s). Typically, IoT devices of a single environment are located at the same physical location (e.g. within a house, building, or other localized environment). In any case, the C-SDK could be located proximate or remote from the rest of the IoT environment.

IoT devices 102, 104 are in communication with computer system 106 via data communication links 114. IoT devices 102, 104 can optionally (as depicted in FIG. 1) be in communication with each other over a communication link 116. The links 114, 116 may form or be a part of one or more network(s), including any one or more networks, such as one or more local area networks and/or one or more wide area networks, such as the internet. Communication links can encompass wired and/or wireless communications links, such as wired and/or cellular, Wi-Fi, or other types of wireless connections.

In some examples, the C-SDK is a simulation node that simulates functionality of one or more IoT devices.

The C-SDK can enable/disable (e.g. 'make' or 'break') connections between IoT devices. The communications between such devices can flow through the C-SDK. In this regard, the C-SDK can act as a messenger. In some embodiments, the C-SDK simulates or spoofs a first IoT device, or communication therefrom, to a second IoT device, to give the impression that the C-SDK is the first IoT device. In instances where communication between IoT devices is direct (not flowing through the C-SDK), the C-SDK may nonetheless have the ability to enable/disable the connection between the two devices, for instance by issuing instructions to one or both IoT devices that control their ability to communicate and/or instruct whether or how they communicate. In other examples, the C-SDK controllably interferes with the communication between the devices, for instance by interfering or manipulating wireless signals being passed between the two devices.

The C-SDK can also control the properties of communications and signals between devices. For instance, the C-SDK can establish partial or weak communications between devices. By way of example, the C-SDK can create a connection with another device to have a desired signal strength (e.g. low, medium, high), particularly applicable to wireless communication links in which Wi-Fi or other wireless signals have a 'strength' property indicative of the strength of the signal. In this particular example, the C-SDK can mimic a weak wireless signal by controlling a wireless radio accordingly. By way of specific example, if the C-SDK were testing the ability of a first IoT device to handle a weak wireless signal from a second IoT device, the C-SDK could tailor a wireless connection between the first device and a wireless adapter in the control of the C-SDK (of the computer system on which the C-SDK is installed, or of another computer system) to have a weak signal, while conveying an appearance to the first IoT device that the connection is with the second IoT device and not the adapter under the control of the C-SDK. The C-SDK could send/receive commands, responses, and other data communications to/from the first IoT device in the same manner that the second IoT device would. The first IoT device may have no knowledge that it is not actually communicating with the second IoT device. In another example, the C-SDK controls a device to cause interference with a wireless connection between the first and second devices, thereby creating a weak or problematic connection between the first and second devices.

An example process performed by the C-SDK or other component(s), derives objective functions of an IoT ecosystem/environment having a collection of IoT devices. The objective function(s) for such an environment can be obtained directly from the description of the IoT environment and/or using information in the description.

For instance, a system (such as one running or under control of the C-SDK software) or another system, parses a description of the IoT ecosystem, for instance using natural language processing (NLP) techniques, and derives one or more objective functions of the IoT ecosystem. The IoT environment description can be a written description provided by an administrator or tester, as examples. The description can indicate properties of at least first-order objective function(s) of the IoT environment. In some cases, accomplishing a first-order objective function is based on/depends on performance of one or more second-order, third-order, etc. (i.e. lower level) objective functions. The objective functions derived from the description, either directly or indirectly as described herein, can refer to the possible first, second, and higher-order outputs derived during the process(es) performed by the IoT ecosystem.

By way of example, in an IoT ecosystem to detect occupancy of a room, the first-order, 'highest-level', objective function and use case may be 'detect room occupancy'. The description of the IoT ecosystem might therefore indicate that the IoT ecosystem can be used to detect room occupancy. The way the environment uses to perform that object may be a function of various other higher-order (i.e. lower-level) objective functions, for instance: (i) room temperature detection (a greater number of room occupants raises room temperature), (ii) room sound detection (a greater number of occupants tends to be louder), and/or (iii) wireless signal strength variations (occupants in a room tend to have an interference effect on wireless signals traveling across the room), as examples. The foregoing are three second-order functions. Performance of these second-order functions might themselves be based on performing even lower-level (third-order, fourth-order, etc.) functions. It is noted that different device combinations may be used in the perform of different objective functions; some devices may be leveraged for data in performing a second-order function but not the first-order function, for instance.

The system derives the properties of the first-order objective function from the IoT ecosystem description and then uses, e.g., crowd-sourced knowledge, to expand subsequent-order (second, third, etc.) objective functions. Online resources, reference material, technical publications, and the like can inform lower level functions to perform higher level functions. Thus, aspects ascertain, based on the IoT environment description, one or more objective functions of the IoT environment, and this ascertaining can include iteratively ascertaining lower level objective function(s) to accomplish higher level objective function(s).

Once the objective functions are derived, the system can crawl and review various online resources (such as online forums) to extract text snippets reporting various issues related to one or more of the identified objective functions. The text snippets may be ones classified as 'negative' in tone or sentiment, which convey issues or problems for instance.

In this manner, crawling the online resources discovers example scenarios that identify problems related to the ascertained objective function(s) of the target IoT environment. Each of the example scenarios can involve a respective set of IoT devices, that is one or more devices that were involved in the problem described in the scenario presented in the online resource. The crawling can use natural language processing against information available from the online resources to discover the example scenarios, including problems exhibited under the example scenarios and the respective sets of IoT devices involved. For instance, based on text semantic correlation techniques, various possible scenarios causing issues related to each of the identified objective functions are derived. Semantic keyword spotting in online forums can identify the text snippets from the online resources. These identified snippets may be filtered using a sentiment classifier to identify and extract negative text snippets. In other words, an initial review of online resources can identify text snippets that are related to any of the ascertained objective functions of the target IoT environment. From that, sentiment analysis can be applied to classify each of the snippets and identify the ones that are considered negative and therefore indicative of a functional problem with the behavior of involved devices.

Stress testing the environment can be performed, in which the IoT environment is automatically tested to assess functionality of the IoT environment in performing at least one of the objective functions. For example, the testing might focus on a particular one (or more) of the objective functions for targeted testing, which may be desired if not all of the objectives are to be tested together.

For each identified negative text snippet, the C-SDK or another component can: (i) parse the text snippet to identify a set, <S>, of IoT component(s) involved in the scenario. This is an identification of the IoT device(s) involved in the problem found online; (ii) check and identify IoT components <FS> from the target IoT environment ecosystem that correlate to those devices of <S>. This aspect identifies the set, <FS>, of IoT devices of the target IoT environment based on their correlation to the set of IoT devices <S> of the IoT environment involved in the example discovered from the online resource; and (iii) create various testing setups to enable or disable connections across <FS> in some or all possible combinations. The created collection of tests have varying enabled/disabled connections between the set of IoT devices of the IoT environment. Additionally, properties of enabled connections can be tailored as desired. For instance, signal strength of wireless connections, bandwidth of data connections, latency, and data integrity can be controlled by the C-SDK to help simulate practical scenarios. System test runs can be executed for each of the testing setups, to actually run the previously creates tests. This can provide a high chance of bug/error discovery, as the system can create testing scenarios with disabled and/or problematic/weak connections across combinations of components in an attempt to discover problems experienced and reported by others in environments with similar objective functions.

The C-SDK can selectively control communications between a set of IoT devices of the IoT environment. This selectively controlling can include enabling and disabling data communications between the set of IoT devices as dictated by the tests and when tests are executed. The execution is monitored for errors in the IoT environment's performance of some or all of the objective functions, for instance those being tested by the particular tests.

As noted, the C-SDK can spoof data communications between an IoT device of the set of IoT devices of the IoT environment and another device of the IoT environment (either another IoT device or other type of device).

Accordingly, aspects discover from online resources scenarios where problems arise in the performance of objectives similar or the same as those of a target IoT environment. These inform particular testing scenarios and particular IoT devices to be involved in those various tests. The tests involve selective control over the connections between devices, for instance whether the connections are enabled or disabled (broken) and/or properties of those connections.

By way of another example, assume a basic environment involving an omnidirectional wireless router and a wireless smart device across the room. In this situation, a description of the target IoT environment indicates an objective function of testing reliable wireless data transfer between the router and smart device, i.e. at 100 Mbps. This is an example first-order objective function. Assume that for a same or similar environment, for instance one including a wireless router and a wireless device, an online forum details a problem situation in which signal strength on the wireless device was undesirably low when the device was located to one side of the router. The C-SDK might indicate a desire to mimic an omnidirectional router in that target room. Based on crowd-sourced information, a second-order objective function is indicated in that signal strength should be "good" or better to achieve the 100 Mbps data rate. A third-order objective function might indicate that between 50 and 70% of capable dBm is needed for "good" signal quality.

The online scenario suggests that position of the wireless device relative to the router might affect signal strength. Meanwhile, online resources might identify that an omnidirectional router having model A123 experiences connectivity issues when communication with devices running Mobile OS1 9.4 but not Mobile OS1 9.8 or Mobile OS2 4.2.

Therefore, testing might test connections between the various wireless device with the three different operating systems and the router across various signal strengths. In a test scenario, the C-SDK might sit as a proxy between the wireless device and the router. In some embodiments, the router is not present and the C-SDK simulates the router completely and/or the mobile devices completely. In any event, the C-SDK can simulate signal strengths in the connection with the wireless devices across any of varying angles by varying signal strength. The C-SDK might provide simulated signals for, e.g., 0, 45, 90, 135, and 180 degrees. It can use the objective functions and/or other resources to identify ways to simulate conditions (such as angular relation between devices).

As an enhancement, aspects can also initiate troubleshooting, fixes, etc. based on outcome of the testing. For example, if a particular test discovers errors in functionality in a particular case, the process could build and send an alert to an administrator or other user, and/or automatically implement a reconfiguration of one or more of the IoT devices (and optionally reinitiate the testing to see whether the reconfiguration eliminated the problem).

Figure 2:
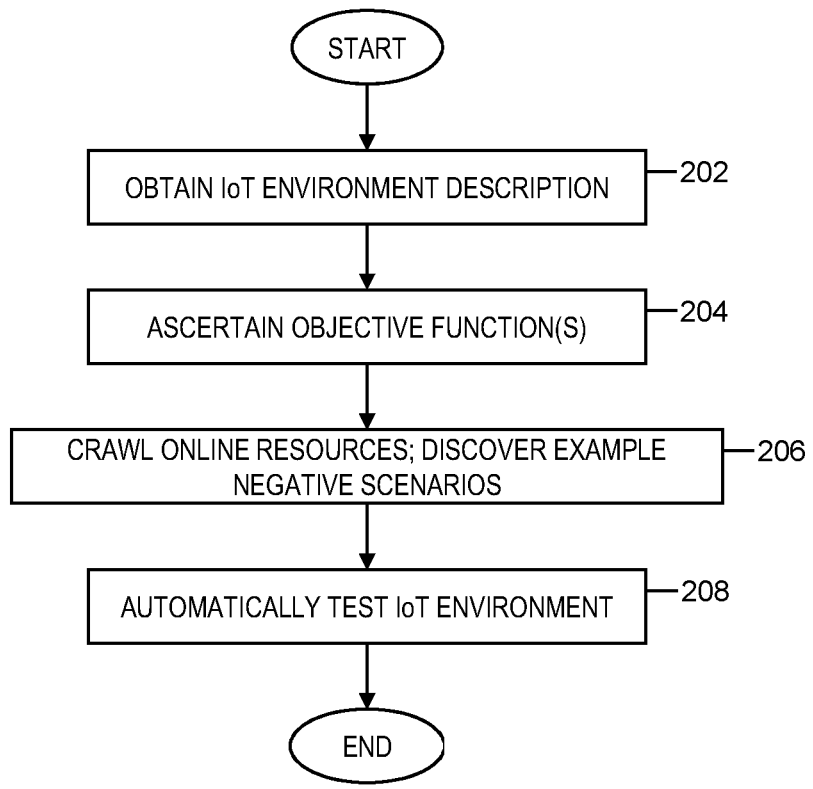
FIG. 2 depicts an example process for testing functionality of an IoT environment, in accordance with aspects described herein.

FIG. 2 depicts an example process for testing functionality of an IoT environment, in accordance with aspects described herein. In some examples, the process is performed by one or more computer systems, such as those described herein, which may include one or more computer systems running or under the control of a C-SDK program, which may include one or more systems local to or remote from the rest of the devices of the IoT environment, and/or one or more other computer systems.

The process begins by obtaining, for an Internet of Things (IoT) environment/ecosystem having a plurality of IoT devices, a description of the IoT environment (202). The process ascertains, based on the description, one or more objective functions of the IoT environment (204). The description can indicate properties of a first-order objective function of the IoT environment. In some examples, accomplishment of the first-order objective function is based on performance of one or more subsequent-order objective functions, which can themselves be ascertained by any desired method, for instance by crowd-sourcing information indicating lower-level functions to accomplish higher-level functions. The first and subsequent-order objective functions are included in the ascertained objective function(s). Ascertaining the objective functions can therefore include iteratively ascertaining the one or more subsequent-order objective functions that accomplish the first-order objective function.

In particular examples, the ascertaining includes using natural language processing against the description of the IoT environment to ascertain the first-order objective function.

The process of FIG. 2 continues by crawling online resources and discovering example scenario(s) in which problems related to the ascertained one or more objective functions are identified (206). These example scenario(s) can each involve a respective set of IoT devices of the particular environment in which the scenarios occur. The crawling can use natural language processing against information available from the online resources to discover the example scenario(s), including problems exhibited under the example scenario(s) and the respective sets of IoT devices involved.

The process automatically tests the IoT environment to assess functionality of the IoT environment in performing at least one of the one or more objective functions (208). The automatic testing includes selectively controlling communications between a set of IoT devices of the IoT environment, the set of IoT devices of the IoT environment being selected from the plurality of IoT devices of the IoT environment based on the example scenario(s) discovered from the crawling. In some embodiments, the selectively controlling the communications includes enabling and disabling data communications between the set of IoT devices. Data communications can occur across wired and/or wireless communications paths of the IoT environment.

In some aspects, the automatically testing can include spoofing data communications between an IoT device of the set of IoT devices of the IoT environment and another device of the IoT environment.

Figure 3:
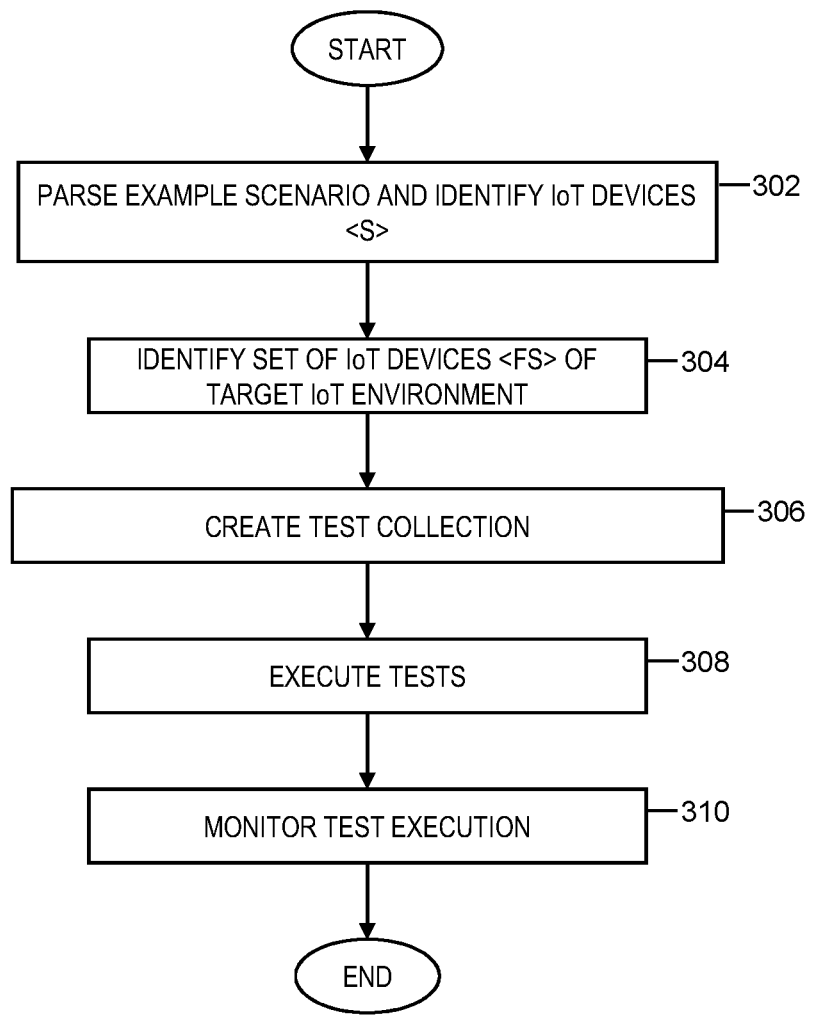
FIG. 3 depicts an example process for automatically testing an IoT environment, in accordance with aspects described herein.

FIG. 3 depicts an example process of automatically testing an IoT environment (e.g. FIG. 2, #208), in accordance with aspects described herein. In some embodiments, the process is performed for each discovered example scenario of the example scenario(s), and is performed by one or more computer systems, such as one or more computer systems that perform processing of FIG. 2.

The process parses information made available from an online resource about the example scenario, and identifies the respective set of IoT devices involved in the example scenario (302). The process then identifies the set of IoT devices (of the target IoT environment for testing) based on correlation of that set of IoT devices of the IoT environment to the identified set of IoT devices involved in the example (304). Correlations between devices can be made based on any of varying properties, for instance manufacturer, model, firmware revision, operating system, type, function, etc.

While in some cases the devices in the target may be the same as those of the scenario environment, many times at least some devices will be different. The process creates a collection of tests with varied enabled and disabled connections between the set of IoT devices of the IoT environment (306), executes the tests (308), and monitors their execution (310) to discover errors in performing the particular objection function(s) being tested.

Although various examples are provided, variations are possible without departing from a spirit of the claimed aspects.

Figure 4:
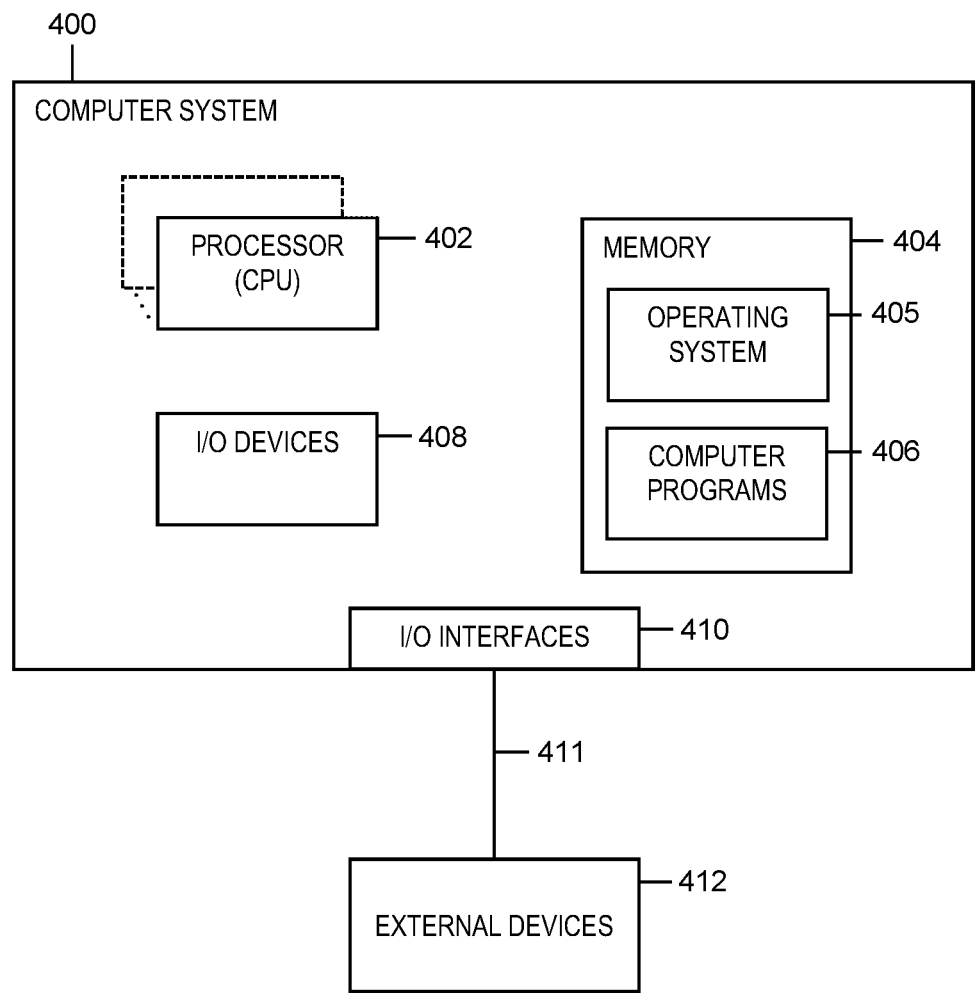
FIG. 4 depicts one example of a computer system and associated devices to incorporate and/or use aspects described herein.

Processes described herein may be performed singly or collectively by one or more computer systems, such as one or more computer systems of, or in communication with devices of, an IoT environment. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
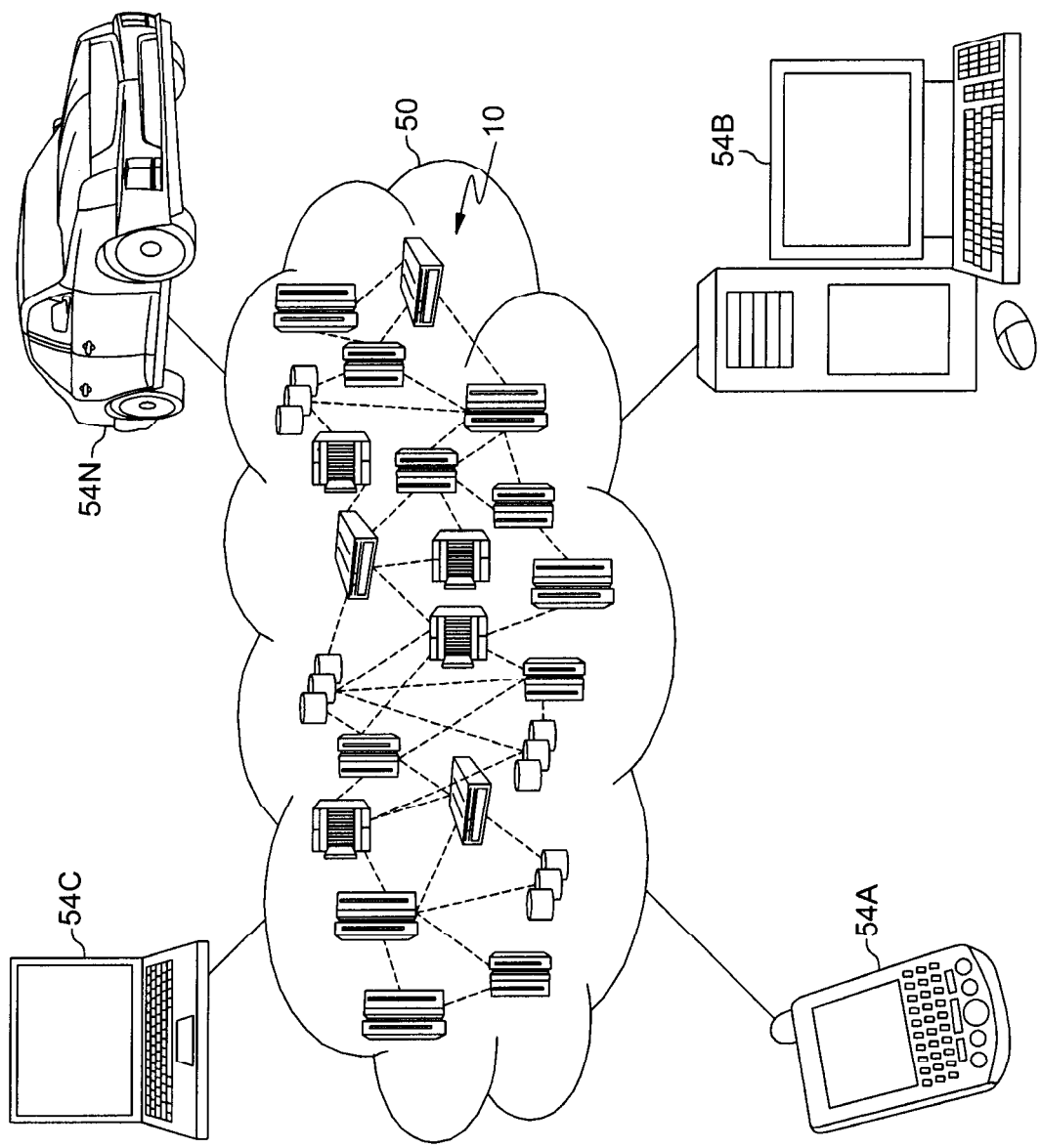
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
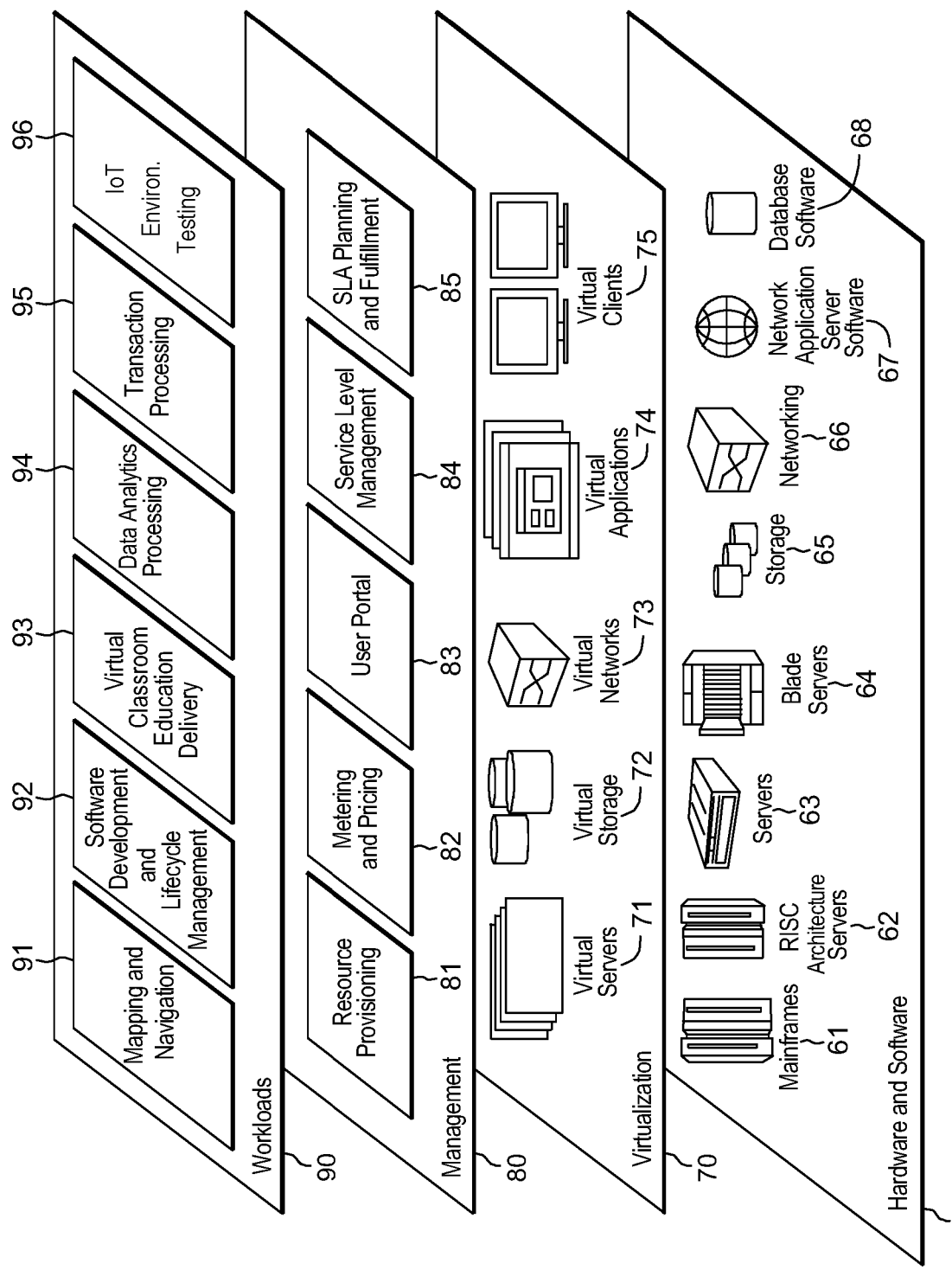
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT environment testing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    obtaining, for an Internet of Things (IoT) environment comprising a plurality of IoT devices, a description of the IoT environment;
    ascertaining, based on the description, one or more desired objective functions of the IoT environment;
    crawling online resources and discovering one or more example scenarios in which problems in achieving the ascertained one or more desired objective functions are identified, the one or more example scenarios each involving a respective set of IoT devices; and
    automatically testing the IoT environment to assess functionality of the IoT environment in performing at least one of the one or more desired objective functions, the automatically testing comprising selectively controlling communications between a set of IoT devices of the IoT environment, the set of IoT devices of the IoT environment being selected from the plurality of IoT devices of the IoT environment based on the one or more example scenarios discovered from the crawling.

2. The method of claim 1, wherein the selectively controlling the communications comprises enabling and disabling data communications between the set of IoT devices.

3. The method of claim 2, wherein the data communications occur across wireless communications paths of the IoT environment.

4. The method of claim 1, wherein the automatically testing further comprises spoofing data communications between an IoT device of the set of IoT devices of the IoT environment and another device of the IoT environment.

5. The method of claim 1, wherein the crawling uses natural language processing against information available from the online resources to discover the one or more example scenarios, including problems exhibited under the one or more example scenarios and the respective sets of IoT devices involved.

6. The method of claim 5, wherein the automatically testing further comprises, for each discovered example scenario of the one or more example scenarios:

parsing information made available from an online resource about the example scenario, and identifying the respective set of IoT devices involved in the example scenario;

identifying the set of IoT devices of the IoT environment based on correlation of the set of IoT devices of the IoT environment to the set of IoT devices involved in the example;

creating a collection of tests with varied enabled and disabled connections between the set of IoT devices of the IoT environment;

executing the tests; and monitoring the execution of the tests for errors in performing the at least one of the one or more desired objective functions.

7. The method of claim 1, wherein the description indicates properties of a first-order desired objective function of the IoT environment, wherein accomplishment of the first-order desired objective function is based on performing one or more subsequent-order desired objective functions, wherein the one or more desired objective functions comprises the first-order desired objective function and the one or more subsequent-order desired objective functions, and wherein the ascertaining comprises using natural language processing against the description of the IoT environment to ascertain the first-order desired objective function.

8. The method of claim 7, wherein the ascertaining further comprises iteratively ascertaining the one or more subsequent-order desired objective functions to accomplish the first-order desired objective function.

9. The method of claim 8, wherein the iteratively ascertaining the one or more subsequent-order desired objective functions uses crowd-sourced information indicating lower level functions to accomplish higher level functions.

10. A computer program product comprising:

a computer readable storage medium readable by a processing circuit and storing instructions for execution by the processing circuit for performing a method comprising:

obtaining, for an Internet of Things (IoT) environment comprising a plurality of IoT devices, a description of the IoT environment;

ascertaining, based on the description, one or more desired objective functions of the IoT environment;

crawling online resources and discovering one or more example scenarios in which problems in achieving the ascertained one or more desired objective functions are identified, the one or more example scenarios each involving a respective set of IoT devices; and automatically testing the IoT environment to assess functionality of the IoT environment in performing at least one of the one or more desired objective functions, the automatically testing comprising selectively controlling communications between a set of IoT devices of the IoT environment, the set of IoT devices of the IoT environment being selected from the plurality of IoT devices of the IoT environment based on the one or more example scenarios discovered from the crawling.

11. The computer program product of claim 10, wherein the selectively controlling the communications comprises enabling and disabling data communications between the set of IoT devices.

12. The computer program product of claim 10, wherein the crawling uses natural language processing against information available from the online resources to discover the one or more example scenarios, including problems exhibited under the one or more example scenarios and the respective sets of IoT devices involved.

13. The computer program product of claim 12, wherein the automatically testing further comprises, for each discovered example scenario of the one or more example scenarios:

parsing information made available from an online resource about the example scenario, and identifying the respective set of IoT devices involved in the example scenario;

identifying the set of IoT devices of the IoT environment based on correlation of the set of IoT devices of the IoT environment to the set of IoT devices involved in the example;

creating a collection of tests with varied enabled and disabled connections between the set of IoT devices of the IoT environment;

executing the tests; and monitoring the execution of the tests for errors in performing the at least one of the one or more desired objective functions.

14. The computer program product of claim 10, wherein the description indicates properties of a first-order desired objective function of the IoT environment, wherein accomplishment of the first-order desired objective function is based on performing one or more subsequent-order desired objective functions, wherein the one or more desired objective functions comprises the first-order desired objective function and the one or more subsequent-order desired objective functions, and wherein the ascertaining comprises using natural language processing against the description of the IoT environment to ascertain the first-order desired objective function.

15. The computer program product of claim 14, wherein the ascertaining further comprises iteratively ascertaining the one or more subsequent-order desired objective functions to accomplish the first-order desired objective function, wherein the iteratively ascertaining the one or more subsequent-order desired objective functions uses crowd-sourced information indicating lower level functions to accomplish higher level functions.

16. A computer system comprising:

a memory; and a processor in communication with the memory, wherein the computer system is configured to perform a method comprising:

obtaining, for an Internet of Things (IoT) environment comprising a plurality of IoT devices, a description of the IoT environment;

ascertaining, based on the description, one or more desired objective functions of the IoT environment;

crawling online resources and discovering one or more example scenarios in which problems in achieving the ascertained one or more desired objective functions are identified, the one or more example scenarios each involving a respective set of IoT devices; and automatically testing the IoT environment to assess functionality of the IoT environment in performing at least one of the one or more desired objective functions, the automatically testing comprising selectively controlling communications between a set of IoT devices of the IoT environment, the set of IoT devices of the IoT environment being selected from the plurality of IoT devices of the IoT environment based on the one or more example scenarios discovered from the crawling.

17. The computer system of claim 16, wherein the selectively controlling the communications comprises enabling and disabling data communications between the set of IoT devices.

18. The computer system of claim 16, wherein the crawling uses natural language processing against information available from the online resources to discover the one or more example scenarios, including problems exhibited under the one or more example scenarios and the respective sets of IoT devices involved.

19. The computer system of claim 18, wherein the automatically testing further comprises, for each discovered example scenario of the one or more example scenarios:
parsing information made available from an online resource about the example scenario, and identifying the respective set of IoT devices involved in the example scenario;
identifying the set of IoT devices of the IoT environment based on correlation of the set of IoT devices of the IoT environment to the set of IoT devices involved in the example;
creating a collection of tests with varied enabled and disabled connections between the set of IoT devices of the IoT environment;
executing the tests; and
monitoring the execution of the tests for errors in performing the at least one of the one or more desired objective functions.

20. The computer system of claim 16, wherein the description indicates properties of a first-order desired objective function of the IoT environment, wherein accomplishment of the first-order desired objective function is based on performing one or more subsequent-order desired objective functions, wherein the one or more desired objective functions comprises the first-order desired objective function and the one or more subsequent-order desired objective functions, and wherein the ascertaining comprises:
using natural language processing against the description of the IoT environment to ascertain the first-order desired objective function; and
iteratively ascertaining the one or more subsequent-order desired objective functions to accomplish the first-order desired objective function, wherein the iteratively ascertaining the one or more subsequent-order desired objective functions uses crowd-sourced information indicating lower level functions to accomplish higher level functions.

* * * * *